(12) United States Patent
Im et al.

(10) Patent No.: US 8,029,931 B2
(45) Date of Patent: Oct. 4, 2011

(54) ANODE ACTIVE MATERIAL, METHOD OF PREPARING THE SAME, AND ANODE AND LITHIUM BATTERY CONTAINING THE MATERIAL

(75) Inventors: Dong-min Im, Seoul (KR); Mi-jeong Song, Suwon-si (KR); Jin-hwan Park, Seoul (KR); Gue-sung Kim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 857 days.

(21) Appl. No.: 11/219,775

(22) Filed: Sep. 7, 2005

(65) Prior Publication Data
US 2006/0134516 A1 Jun. 22, 2006

(30) Foreign Application Priority Data

Dec. 18, 2004 (KR) .................. 10-2004-0108411

(51) Int. Cl.
*H01M 4/13* (2010.01)
*H01M 4/62* (2010.01)
(52) U.S. Cl. ..................... 429/231.8; 429/232
(58) Field of Classification Search ............... 429/218.1, 429/231.8, 232
See application file for complete search history.

(56) References Cited

U.S. PATENT DOCUMENTS

| 6,589,696 | B2 | 7/2003 | Matsubara et al. |
| 6,733,922 | B2 | 5/2004 | Matsubara et al. |
| 7,618,678 | B2* | 11/2009 | Mao et al. ..................... 427/212 |
| 2003/0157407 | A1* | 8/2003 | Kosuzu et al. ........... 429/231.95 |
| 2003/0219653 | A1* | 11/2003 | Kelley et al. .................. 429/245 |
| 2006/0133980 | A1* | 6/2006 | Nanba et al. ............. 423/445 R |

FOREIGN PATENT DOCUMENTS

| JP | 04-237971 | 8/1992 |
| JP | 6-318454 | 11/1994 |
| JP | 09-249407 | 9/1997 |
| JP | 10-003907 | 1/1998 |
| JP | 2000-173612 | 6/2000 |
| JP | 2000-251879 | 9/2000 |
| JP | 2000-357514 | 12/2000 |
| JP | 2001-196064 | 7/2001 |
| JP | 2002-008652 | 1/2002 |
| JP | 2003-263986 | 9/2003 |
| JP | 2004-055505 | 2/2004 |
| JP | 2004-349056 | 12/2004 |
| KR | 2001-0096073 | 11/2001 |
| KR | 10-2001-0113448 | 12/2001 |
| KR | 10-2004-0040473 | 5/2004 |
| WO | WO2004109825 A2 * | 12/2004 |

* cited by examiner

*Primary Examiner* — Patrick Joseph Ryan
*Assistant Examiner* — Muhammad Siddiquee
(74) *Attorney, Agent, or Firm* — H.C. Park & Associates, PLC

(57) ABSTRACT

An anode active material comprises graphite core particles, and a first coating layer and a second coating layer formed on the surface of the graphite core particles. The first coating layer comprises silicon microparticles and the second coating layer comprises carbon fiber.

16 Claims, 1 Drawing Sheet

ANODE ACTIVE MATERIAL, METHOD OF PREPARING THE SAME, AND ANODE AND LITHIUM BATTERY CONTAINING THE MATERIAL

CROSS-REFERENCE TO RELATED PATENT APPLICATION

This application claims priority to and the benefit of Korean Patent Application No. 10-2004-0108411, filed on Dec. 18, 2004, in the Korean Intellectual Property Office, the disclosure of which is incorporated in its entirety by reference as if fully set forth herein.

BACKGROUND OF THE INVENTION

1. Field of the Invention

The present invention relates to an anode active material, a method of preparing the same, and an anode, and a lithium battery comprising the material. In particular, the present invention relates to an anode active material that has excellent charge/discharge efficiency and is effective charge capacity, a method of preparing the same, and an anode, and a lithium battery comprising the material.

2. Description of the Background

Non-aqueous electrolyte rechargeable batteries that include a lithium compound as an anode, exhibit high voltage and high energy density and have been studied. Previously, lithium metal was studied because of its high power storage capacity. However, when metallic lithium is used as an anode material, lithium dendrite deposits onto the surface of metallic lithium on charging. The lithium dendrite reduces charge/discharge efficiency of the battery and may provoke a short-circuit. Also, the risk of explosion and high sensitivity to heat and shock caused by lithium's instability or high reactivity prevented metallic lithium anode batteries from commercializing.

The use of a carbon-based anode addresses some of the problems of lithium. Lithium ions present in electrolyte intercalate/deintercalate between the graphite layers of the carbon-based anode, thereby performing oxidation/reduction reactions. The carbon-based anode has solved various problems associated with lithium metal and has contributed to its popularization. However, there is the need for lightweight, low volume lithium rechargeable batteries with higher capacity for use in portable electronic devices.

A lithium battery containing a carbon-based anode has essentially lower battery capacity due to its limited lithium storage ability. For example, even for graphite with the highest crystallinity, the theoretical capacity of a $LiC_6$ composition is about 372 mAh/g which is less than 10% of the theoretical capacity of lithium metal of 3860 mAh/g. Therefore, much research has been performed to improve the power storage capacity of a battery by introducing a metal such as lithium to anode.

Alloys such as Li—Al, Li—Pb, Li—Sn and Li—Si may provide higher electric capacity than a carbon-based material. However, when such alloys or metals are used alone, deposition of lithium dendrite occurs. Therefore, use of a suitable mixture of such alloys, metals, and carbon-based material has been researched to not only increase electric capacity but also to avoid problems such as a short circuit. However, the volume expansion coefficient on oxidation/reduction of a carbon-based material is different from that of a metal, and the metal can react with electrolyte. On charging of an anode material, the lithium ion is introduced into the anode material. The anode expands and its structure becomes more dense. Then, on discharging, the lithium ion leaves and volume of the anode decreases. If the anode contracts, a void remains for spatial gaps that are not filled due to the difference in the expansion coefficient of carbon-based material and that of the metal. Therefore, due to the electrically non-connected spatial gap, electron conduction is ineffective and the efficiency of the battery decreases. Also, a reaction between the metal and the electrolyte during charge/discharge can decrease the lifespan of electrolyte, and the lifespan and efficiency of the battery.

Various methods have been proposed to solve the problems caused by using a composite material.

Japanese Patent Laid-Open Application No. 1994-318454 discloses an anode comprising a mixture of powder of metal flakes or alloy flakes, powder of carbon fiber flakes, and a binder. The invention includes a metal or an alloy powder that is laminated parallel to the surface of the electrode so that constant pressure is applied to the overall electrode against expansion/contraction of the electrode on operating the battery, thereby inhibiting insufficient charge collection caused by a repeating charge/discharge cycle. However, although powder flakes are used, it is difficult to solve the problems caused by charge/discharge by using only the simple mixture. Consequently, stress caused by expansion/contraction of metal and disconnection of electronic conduction path may worsen, thus reducing battery capacity with increasing the number of cycles of charge/discharge.

Japanese Patent Laid-Open Application No. 1997-249407 discloses an anode comprising graphite particles and metal particles that form an alloy with lithium. The anode is fabricated by preparing a raw powder including graphite particles and metal particles and pulverizing the powder to prepare graphite composites that have high crystalline graphite particles and metal microparticles in dispersed form. However, even in this case, it is difficult to avoid the binding of the metal particles with the graphite particles, since the invention uses a simple mixture method.

Japanese Patent Laid-Open Application No. 1998-003907 discloses an anode comprising carbon particles and metal microparticles that form an alloy with lithium, which are carried on the surface of the carbon particle. In this invention, the anode is formed not by simple mixing but by placing relatively small metal microparticles on the surface of the carbon particles. Thus, anode damage may be avoided since the difference in the relative volume expansion coefficient is minimized. In this invention, inventors assert that discharge capacity, charge/discharge rate and the like may improve. However, the problems such as stress caused by expansion/contraction and disconnection of electron transfer path still remain.

U.S. Pat. No. 6,589,696 discloses an anode formed by placing silicon microparticles on the surface of graphite particles and then coating them with a carbon film. This coating separates the metal and the electrolyte, and adheres the graphite material closely to silicon microparticles to block the reaction between the metal particles and electrolyte to improve conductivity. The anode material has good charge and discharge capacity and high charge/discharge efficiency. However, complete blocking between metal particles and an electrolyte may not be achieved with only the carbon film. Also, constant charge/discharge characteristics may be realized using another conducting agent, since the conductivity of the carbon film is lower than that of graphite.

Accordingly, there is a need for an anode active material with improved charge/discharge characteristics that can overcome the problems described above.

SUMMARY OF THE INVENTION

The present invention provides an anode active material with improved charge/discharge capacity and charge/discharge efficiency.

The present invention also provides an anode and a lithium battery including an anode active material.

The present invention also provides a method for preparing the anode active material of the present invention.

Additional features of the invention will be set forth in the description which follows, and in part will be apparent from the description, or may be learned by practice of the invention.

The present invention discloses an anode active material comprising graphite core particles, and a first coating layer and a second coating layer that are formed on the surface of the graphite core particles, wherein the first coating layer comprises silicon microparticles and the second coating layer comprises carbon fibers.

The present invention also discloses a method for preparing the anode active material comprising combining a polymer material, a graphite core, and silicon microparticles with a solvent to form a first mixture, drying and stirring the first mixture, and then calcining the dried first mixture to form a first coating layer. The method further comprises combining a polymer material, a graphite core with the first coating layer, and carbon fibers with a solvent to form a second mixture, and then drying and stirring the second mixture, and calcining the dried second mixture to form a graphite core with a first coating layer and a second coating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
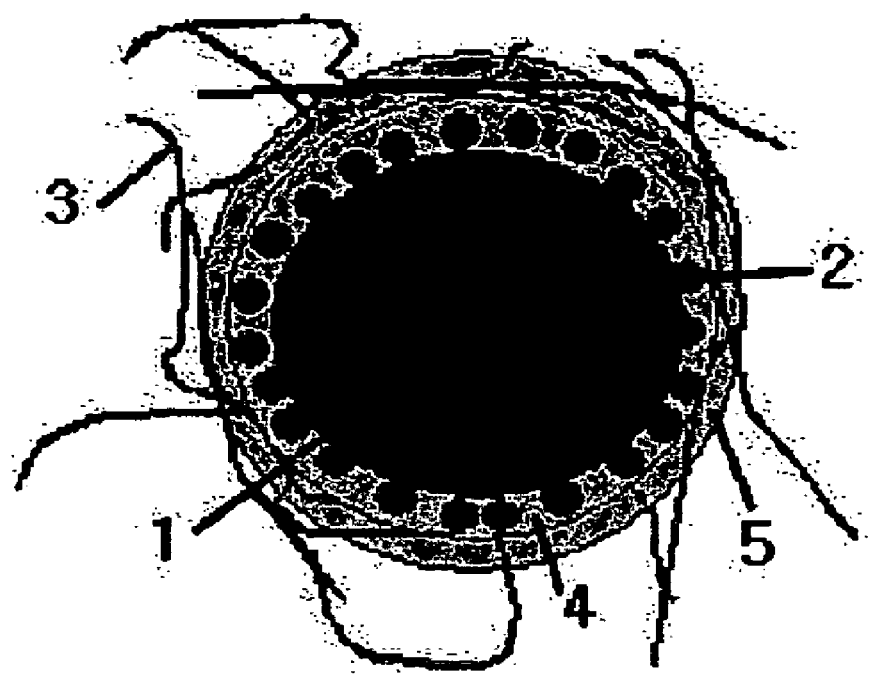
FIG. 1 is a cross-sectional view of the anode active material according to Example 1 of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

The anode active material of the present invention is advantageous because it is stable under low voltage, has excellent electronic conductivity and elasticity, and it resolves stress caused by the difference of volume expansion between carbon-based active materials and metal active materials. In addition, it significantly reduces the possibility of direct exposure of a metal to an electrolyte and can increase conductivity of the surface of the graphite particle without reducing the amount of silicon that adheres to the surface of graphite particle. Further, a process for preparing the anode active material of the present invention is simplified because it does not have to use any other conducting agent. Furthermore, an anode and a lithium battery that include the anode active material of the present invention have improved charge/discharge characteristics.

Referring to FIG. 1, the anode active material of the present invention comprises a graphite core particle 1, and a first coating layer 4 and a second coating layer 5 that are formed on the surface of the graphite core particles. The first coating layer includes silicon microparticles 2 and the second coating layer includes carbon fibers 3.

To provide high power storage capacity to a battery that uses a carbon-based anode, the intercalation ability may be increased by raising the degree of graphitization (crystallinity) of carbon-based material. A graphitization method such as heat treatment at a high temperature is used to increase crystallinity.

For the anode active material of the present invention, a high crystalline graphite particle with an interlayer spacing of 3.45 Å or less is used as the core. There are not any specific limitations on particle size and particle shape of the graphite particle. Accordingly, any type of graphite including artificial graphite and natural graphite that can be used in a lithium rechargeable battery may be used in the present invention.

To further increase electric capacity, a first coating layer comprising silicon microparticles is formed on the graphite core particle. The silicon microparticles may increase the energy density of the anode material since, similarly to graphite particle, the silicon microparticles that form an alloy with lithium can perform a reversible oxidation/reduction reaction with lithium on charging/discharging.

Also, the silicon microparticles may improve discharge capacity since their charge/discharge voltage is similar to that of anode material, and the discharging curve is maintained relatively constant against voltage. Further, since the silicon microparticles and graphite core adhered to each other by the first coating layer, they can stay connected on charging/discharging.

A second coating layer that includes carbon fibers is formed on the surface of the first coating layer. The fine carbon fibers may have an aspect ratio of 10 or more, a long conducting path, and excellent conductivity due to good crystallinity. Also, the fine carbon fibers do not decrease the capacity of lithium battery since the fine carbon fibers have self-charging/discharging abilities. Additionally, the fine carbon fibers can resolve stress on the anode that is caused by repeated charge/discharge, since the carbon fibers have low density. The carbon fibers can also endure a relative change in the shape of anode materials from volume expansion/contraction caused by repeating charge/discharge due to its self-elasticity. Also, the fine carbon fibers can prevent electric disconnection of the particles during recontraction after expansion of particles, since the fine carbon fibers are elastic and conductive. Therefore, the fine carbon fibers solve the problems of conventional batteries while also serving as a simple filler.

In particular, in the anode active material of the present invention, the first coating layer coats the graphite core particle and the second coating layer coats the first coating layer. Such double coating may substantially prevent an internal anode active material from contacting the electrolyte.

Also, the first coating layer and the second coating layer may each be formed of a plurality of layers. For example, the first coating layer may be a mono-layer of carbon film or multiple-layers of several carbon films. The second coating layer may be formed in a similar manner.

The graphite core of the present invention may be a single graphite particle, aggregates of graphite particles, or various mixtures thereof. The graphite core is preferably formed of a single graphite particle, but various shapes including aggregates of two or more particles may form the graphite core.

For example, the first coating layer may be formed of a carbon film that binds to graphite particles and is coated on the surface of the graphite core comprising a plurality of graphite particles with intervening silicon microparticles dispersed among the graphite particles. Then, the anode active material may be formed by adhering or coating the surface of the first coating layer with carbon fibers and coating again it with a carbon film to form a second coating layer.

The second coating layer comprises a plurality of graphite core particles with the first coating layer formed thereon with fibers that are dispersed among the graphite core particles on which the first coating layer is formed.

The first coating layer may comprise silicon microparticles that are present on the surface of the graphite core particles in a dispersed form. Also, silicon microparticles may be densely present on the surface of graphite core particles. By this arrangement, the anode active material formed of graphite particles and silicon microparticles may have higher electric capacity. Further, silicon microparticles may be present in the graphite core.

The carbon fibers of the second coating layer may be present on the surface of the first coating layer as well as within the second coating layer. Carbon fibers may form flocks, since they comprise split fine fibers and long main fibers so that they can be spread throughout the second coating layer as well as on the surface of the first coating layer.

The carbon fibers may be fixed to the surface of the first coating layer by first coating graphite core particles with the carbon film and forming the first coating layer including silicon microparticles. Then the first coating layer is coated with the carbon film to form the second coating layer containing the carbon fiber. The second coating layer increases the electrical connection between the anode active material and other particles by the carbon fibers contained therein, and prevents silicon microparticles form contacting the electrolyte.

When the silicon microparticles and the carbon fibers are mainly present on the surface of the first coating layer and graphite core particle, they can be coated effectively with the coating films, and cracks caused by expansion/contraction of electrode materials may be minimized.

The first coating layer may be about 0.1 μm to about 3 μm thick. If the average thickness is less than 0.1 μm, the effectiveness of blocking electrolyte penetration decreases, and it is difficult to increase the concentration of silicon microparticles that the first coating layer may comprise. If the average thickness is more than 3 μm, electric resistance increases. Although it is preferable to maintain uniform thickness of the first coating layer around the graphite core, the effect of the present invention may be achieved even if the thickness is non-uniform or the graphite core is coated only partially.

The second coating layer may comprise carbon fibers and a carbon film to fix the carbon fibers. There are no specific limitations on the thickness of the carbon film but it may be about 0.1 μm to about 3 μm thick to avoid increasing electric resistance. When the thickness is less than 0.1 μm, it is difficult to adhere carbon fibers to the surface of the first coating layer. Similar to the first coating layer, the second coating layer may be coated uniformly over the first coating layer. If the second coating layer is present on a portion of the first coating layer, the second coating layer may significantly increase the electric connection to other circumjacent particles or current collecting bodies.

There are no specific limitations on the average particle size of the graphite core particle comprising the anode active material of the present invention, but the particle size of silicon may be about 0.01 μm to about 1 μm. When the silicon particle size is less than 0.01 μm, it is so small that almost all of the metal may transform into a carbide compound during heat treatment. When the particle size of silicon is more than 1 μm, stress caused by volume expansion may worsen.

The diameter of the carbon fibers may be about 0.01 μg to about 1 μm. When the diameter is less than 0.01 μm, the carbon fibers weaken. When the carbon fibers are used as an electrode material, the fracture of the carbon fibers increases during processing the carbon fibers such as pressing, which may damage the function of the carbon fiber. When the diameter of the carbon fiber is more than 1 μm, it is uneconomical due to its high cost.

The aspect ratio of the carbon fibers may be about 10 or higher, and preferably about 10 to about 200. When the aspect ratio is less than 10, it is difficult to provide elasticity to have space between particles, endure repeated expansion/contraction of particles, and maintain conductivity. When the aspect ratio is more than 200, it is difficult to form an effective second coating layer since carbon fibers cannot be dispersed uniformly in the polymer solution. Therefore, for example, when the aspect ratio is more than 50, a 0.01 μm diameter carbon fiber may have a length of 0.5 μm or more, and a 0.1 μm diameter carbon fiber may have a length of 5 μm or more.

The carbon fibers may be prepared by various methods. For example, fine fibrous materials such as a multi-structured carbon nanotube, carbon nanofiber, etc., which are prepared by arc discharging or a laser method, may be used. The carbon fibers are preferably prepared by a vapor grown method, but is not limited thereto.

Hereinafter, a method for preparing fine carbon fibers by thermal cracking of a hydrocarbon is described.

On a substrate, ultrafine seed particles are formed using ultrafine particles of a transition metal such as iron, nickel, cobalt or ultrafine particles of organometallic compound such as ferrocene, for example. Then, carbon raw material and an optional carrier gas such as hydrogen, for example, may be supplied in vapor phase. Finally, by decomposing it at a high temperature, fine carbon fibers with a diameter of about 0.01 μm to about 1 μm or more are grown on the seed. The seed may be formed by applying a dispersion of seed particles or a seed solution to a substrate and drying it. It may also be formed by spraying ferrocene or by producing iron or iron compounds in fluid state using ferrocene.

Heat treatment of the carbon fibers produced by the vapor grown method may be performed because the carbon fibers have a high concentration of active iron microparticles, tar components, or components that have a low boiling point adsorbed on the surface of products produced by the reaction.

Carbon fibers produced by the vapor grown method are long wavelike fibers where the crystal-like structure of the cross section of the fiber is developed concentrically. It is difficult to specify the length of the fiber because it depends on production conditions. For example when its diameter is about 0.01 μm to about 1 μm, generally there are single fibers and split fibers. However, the length of most fibers average about 5 μm or more with reference to the results of linear portions that were determined by a scanning tunneling microscope. For shorter fibers that are less than about 5 μm long, the fiber may form a large flock of 10 μm or more or 100 μm or more in size, because the fiber is split in several strands. Therefore, the volume density is at least 0.05 g/cm² or less, typically 0.01 g/cm² or less.

The concentration of the silicon microparticles may be about 3 wt % to about 15 wt % based on the total weight of the anode active material. When the concentration is greater than 15 wt %, the charge/discharge efficiency decreases. When the concentration is less than 3 wt %, the energy density decreases.

The concentration of the carbon fibers is preferably about 0.1 wt % to about 20 wt % based on the total weight of the anode active material. When the concentration is less than 0.1 wt %, the charge/discharge efficiency decreases. When the concentration is more than 20 wt %, the energy density decreases due to the low volume density of the carbon fiber.

The coating film that coats the silicon microparticles and carbon fibers is preferably a carbon film comprising a calcined polymer material. The polymer material may include, but is not limited to a vinyl resin, a cellulose resin, a phenol resin, a pitch resin, and a tar resin, and polyvinylalcohol.

The carbon film that coats the silicon microparticles and the carbon fibers may have face-to-face dimensions of about 3.45 Å or more, or it may be amorphous. If the carbon film has a high crystallinity, it functions as certain graphites to react with the electrolyte. Using a low crystalline or amorphous carbon films, high charge/discharge efficiency may be obtained because the carbon film does not react with the electrolyte and so decomposition of electrolyte is inhibited.

In addition, the carbon film has a compact structure and acts as a reaction protection layer to block the anode material, the graphite core particles, from contacting the electrolyte.

Next, the anode of the present invention is fabricated using the anode active material described above.

The electrode may be fabricated by shaping the anode mixing material including the anode active material and binder into a certain shape, or by applying the anode mixing material to a collector such as a copper foil and so forth.

More specifically, the anode plate may be fabricated by preparing an anode material composition and then directly coating it on the copper foil collector. Alternately, the anode material composition may be cast on a separate support to obtain an anode active film by releasing it from the support and then laminating the film on a copper foil collector. Also, the anode of the present invention may be formed into any shape including the shapes listed above.

Batteries must charge/discharge a large amount of current to achieve high capacity. For this, electrode materials that have a low electric resistance are needed. Therefore, conducting agents such as carbon black and graphite microparticles are often added to decrease the resistance of the electrode. However, the anode active material of the present invention does not require conducting agents because the anode active material has excellent conductivity.

The lithium battery of the present invention includes the anode active material and may be fabricated as follows.

First, the positive active material composition is prepared by mixing a positive active material, a conducting agent, a binder, and a solvent. A cathode plate is prepared by directly coating the positive active material composition to a metal collector and then drying it. The cathode plate may also be manufactured by casting the positive active material composition on a separate support, obtaining a film by releasing it from the support, and then laminating the film on metal collector.

The positive active material may include, but is not limited to lithium-containing metal oxides. For example, the positive active material may include $LiCoO_2$, $LiMn_xO_{2x}$, $LiNi_{1-x}M-n_xO_2(x=1,2)$, $Ni_{1-x-y}Co_xMn_yO_2(0\leq x\leq 0.5, 0\leq y\leq 0.5)$, and more specifically $LiMn_2O_4$, $LiCoO_2$, $LiNiO_2$, $LiFeO_2$, $V_2O_5$, TiS and MoS. These compounds may intercalate/deintercalate lithium.

Carbon black may be used as conducting agent. Vinylidenefluoride/hexafluoropropylene copolymer, polyfluoride, polyacrylonitrile, polymetacrylate, polytetrafluoroethylene and mixture thereof, or styrene butadiene rubber polymer may be used as binder. N-methyl-pyrrolidone, acetone, and water may be used as a solvent but are not limited thereto. Here, the concentration of the positive active material, conducting agent, binder, and solvent are any that are suitable for a lithium battery.

Any suitable material may be used as a separator. Particularly, a separator that has low resistance to ion flow through the electrolyte and has excellent electrolyte carrying ability is preferable. More specifically, a woven or non-woven material including, but not limited to glass fiber, polyester, polyethylene, polypropylene, polytetrafluoroethylene (PTFE) or a combination thereof may be used as separator. For a lithium ion battery, a windable separator formed of polyethylene, polypropylene and so forth may be used, and for a lithium ion polymer battery, a separator that has excellent ability to impregnate an organic electrolyte is used.

A separator may be fabricated as follows. First, a separator composition is prepared by mixing a polymer resin, a filler, and a solvent. Then, a separator may be prepared by directly coating the surface of the electrode with the separator composition and drying it. Alternately, the separator composition may be cast on separate support, obtaining a separator film by releasing the composition from the support, and then laminating the separator film on the surface of an electrode.

Solvents including, but not limited to propylene carbonate, ethylene carbonate, diethyl carbonate, ethyl methyl carbonate, methyl propyl carbonate, butylene carbonate, benzonitrile, acetonitrile, tetrahydrofuran, 2-methyl tetrahydrofuran, γ-butyrolactone, dioxorane, 4-methyl dioxorane, N,N-dimethylformamide, dimethyl acetamide, dimethylsulfoxide, dioxane, 1,2-dimethoxyethane, sulforane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol or dimethyl ether and so forth, or a mixed solvent thereof may be used as a component of an electrolyte solution.

One or more lithium salts including, but not limited to $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO2)(C_yF_{2y+1}SO_2)$ (wherein, x and y is natural number), $LiCl$, and $LiI$ may be used as an electrolyte.

As described above, an electrode assembly is formed by interposing a separator between the cathode plate and the anode plate. A lithium battery is assembled by winding or folding the electrode assembly, introducing it into a cylindrical battery case or a rectangular box shaped battery case, and adding the electrolyte into the battery case.

The lithium ion polymer battery may also be assembled by laminating the electrode assembly in the form of a bicell, impregnating it within an organic electrolyte, introducing the resulting structure into pouch, and sealing it.

A method for preparing the anode active material of the present invention for a lithium battery comprises combining a polymer material, a graphite core and silicon microparticle with a solvent and then drying with stirring. The dried mixture is then calcined to form a first coating layer. Then a polymer material, the graphite core with a first coating layer formed on it, and carbon fibers all combined with a solvent and dried while stirring. The dried mixture is then calcined to form a second coating layer on the graphite core with a first coating layer.

The calcination temperature of the polymer material may range from the carbonization temperature of the polymer material to about 1400° C. When the temperature is more than about 1400° C., silicon melting occurs.

The polymer material may include a resin including, but not limited to vinyl resin, cellulose resin, phenol resin, pitch resin and tar resin.

The following examples and comparative examples further illustrate the present invention, but it is not limited to these examples.

EXAMPLES

Preparation of Anode Active Material

Example 1

20 g of a natural graphite powder (average diameter: 20 μm), 2.0 g of silicon powder (average diameter: 0.5 μm), and 1 g of polyvinylalcohol (PVA, molecular weight: 500) were added to 40 mL of distilled water. After stirring the solution until PVA dissolved completely, the solution was heated and stirred until the water evaporated completely to obtain solid phase material.

After carbonizing PVA completely by heat treating the solid phase material in argon atmosphere at 900° C. for 1 hour, the material was pulverized in a mortar to obtain 22 g of powder coated with a carbon film comprising silicon microparticles as the first coating layer.

5 g of the coated powder, 0.5 g of carbon fiber (VGCF; average diameter: 0.2 μm, aspect ratio: 60), and 0.5 g of PVA were added to 25 mL of distilled water. After stirring the solution until PVA dissolved completely, the solution was heated slowly while stirring until the water evaporated completely to obtain solid phase material.

Then the solid phase material was heat treated in an argon atmosphere at 900° C. for 1 hour and pulverized to obtain 5.4 g of powder coated with a carbon film comprising carbon fibers as the second coating layer.

Example 2

This example was prepared following the same procedure as in Example 1, except that carbon fiber with an average diameter of 0.2 μg/m and an aspect ratio of 150 was used.

Example 3

This example was prepared following the same procedure as in Example 1, except that carbon fiber with an average diameter of 0.02 μm and an aspect ratio of 150 was used.

Example 4

This example was prepared following the same procedure as in Example 1, except that carbon fiber with an average diameter of 0.45 μm and an aspect ratio of 25 was used.

Example 5

This example was prepared following the same procedure as in Example 1, except that 1 g of silicon powder with an average diameter of 0.5 m was used.

Example 6

This example was prepared following the same procedure as in Example 1, except that 3 g of silicon powder with an average diameter of 0.5 μm was used.

Example 7

This example was prepared following the same procedure as in Example 1, except that 2 g of silicon powder with an average diameter of 0.08 μm was used.

Example 8

This example was prepared following the same procedure as in Example 1, except that 0.2 g of carbon fiber with an average diameter of 0.2 μm and aspect ratio of 60 was used.

Example 9

This example was prepared following the same procedure as in Example 1, except that 1.0 g of carbon fiber with an average diameter of 0.2 μm and an aspect ratio of 60 was used.

Example 10

This example was prepared following the same procedure as in Example 1, except that 0.2 g of carbon fiber with an average diameter of 0.2 μm and an aspect ratio of 150 was used.

Example 11

This example was prepared following the same procedure as in Example 1, except that 1.0 g of carbon fiber with an average diameter of 0.2 μm and an aspect ratio of 150 was used.

Comparative Example 1

20 g of a natural graphite powder (average diameter: 20 μm), 2.0 g of silicon powder (average diameter: 0.5 μam) and 1 g of polyvinylalcohol (PVA, Molecular weight: 500) were added to 40 mL of distilled water. After stirring the solution until PVA dissolved completely, the solution was heated and stirred until the water evaporated completely to obtain solid phase material.

After carbonizing PVA completely by heat treating the solid phase material in an argon atmosphere at 900° C. for 1 hour and pulverizing it in a mortar to obtain a powder in which silicon and carbon were coated on graphite particles. The additional step of coating the coated graphite particles with carbon fibers was not performed.

Comparative Example 2

An anode active material was prepared following the same procedure as in Comparative Example 1, except that 26 wt % of conducting agent (graphite microparticles) was used.

The test results are shown in Table 1 wherein, silicon discharge capacity refers to discharge capacity at 0.25 V or higher. Silicon utilization (%) is a ratio of actual discharge capacity by silicon to theoretical discharge capacity of silicon.

TABLE 1

| Example No. | Charge capacity (mAh/g) | Charge capacity at constant current region (mAh/g) | Discharge capacity (mAh/g) | Silicon Discharge capacity (mAh/g) | Silicon Utilization (%) (relative to theoretical capacity) | Charge/discharge efficiency (%) |
|---|---|---|---|---|---|---|
| 1 | 568 | 510 | 515 | 241 | 76.2 | 90.7 |
| 2 | 572 | 515 | 521 | 243 | 76.8 | 91.0 |
| 3 | 573 | 508 | 516 | 240 | 75.9 | 90.1 |
| 4 | 565 | 506 | 509 | 237 | 74.9 | 90.1 |
| 5 | 445 | 398 | 405 | 130 | 78.6 | 91.4 |
| 6 | 706 | 621 | 632 | 343 | 75.5 | 89.5 |
| 7 | 575 | 511 | 522 | 250 | 78.7 | 91.1 |
| 8 | 569 | 504 | 516 | 243 | 72.9 | 90.6 |
| 9 | 572 | 516 | 519 | 240 | 82.4 | 90.7 |
| 10 | 571 | 506 | 519 | 244 | 73.2 | 90.9 |
| 11 | 576 | 522 | 525 | 244 | 83.7 | 91.1 |
| Comp. Ex 1 | 547 | 412 | 244 | 46 | 12.4 | 44.7 |
| Comp. Ex 2 | 561 | 479 | 510 | 217 | 73.9 | 91.0 |

Preparation of Anode Plate

Examples 1 to 11 and Comparative Example 1

A slurry was prepared by mixing 2.91 g of the active material as synthesized above, 0.045 g of styrene butadiene rubber (SBR), and 0.045 g of carboxy methyl cellulose. Then, 5 mL of distilled water was added into the mixture the resulting mixture was stirred for 30 minutes with a mechanical stirrer.

An anode plate was prepared by coating the slurry to a thickness about 200 μm on a Cu collector, drying it, and drying again in vacuum at 110° C.

Comparative Example 2

A slurry was prepared by mixing 2.31 g of the active material as synthesized above, 0.6 g of graphite powder (average diameter: 6 μm), 0.045 g of styrene butadiene rubber (SBR), and 0.045 g of carboxymethyl cellulose. Then, 5 mL of distilled water was added into the mixture and the resulting mixture was stirred for 30 minutes with a mechanical stirrer.

An anode plate was prepared following the same procedure as in Comparative Example 1.

Preparation of Lithium Battery

A 2015 standard coin cell was fabricated according to the following specifications:
 Anode: the anode plate as synthesized in Examples 1 to 11 and Comparative Example 1 and 2
 Cathode: lithium metal
 Separator: PTFE separator
 Electrolyte: 1 M $LiPF_6$ solution dissolved in EC (ethylene carbonate)+DEC (diethyl carbonate)(3:7)
Charging/Discharging Test The coin cell was charged with 50 mA of constant current per 1 g of active material until reaching 0.001 V relative to the Li electrode. Then, the coin cell was charged at constant voltage while maintaining 0.001 V until the current decreased to 5 mA per 1 g of active material.

After resting the charged coin cell for 30 minutes, the coin cell was discharged at a constant current of 50 mA per 1 g of active material until the voltage reached to 1.5 V.

As shown in Table 1, examples that use carbon fibers showed significantly improved charge/discharge capacity and charge/discharge efficiency compared with Comparative Example 1 that uses a conducting agent in place of carbon fiber. When comparing Comparative Example 2 that contains 26 wt % graphite microparticles as a conducting agent with the active material of the present invention. Examples 1-11 of the present invention showed better charge capacity in a constant current region (that is, an index that represents silicon utilization relative to theoretical capacity and available capacity in a real battery) compared to Comparative Example 2. That is why it is believed that improved electronic conductivity results from using carbon fibers and a second coating layer that allows for efficient use of silicon and a reversible anode reduction reaction.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An anode active material, comprising:
 a graphite core; and
 a first coating layer formed on the surface of the graphite core; and
 a second coating layer formed on the surface of the first coating layer,
 wherein the first coating layer comprises silicon microparticles coated with a first carbon film, and the second coating layer comprises carbon fiber coated with a second carbon film,
 wherein the carbon fiber is separated from the graphite core and the silicon microparticles, and
 wherein the average particle size of the silicon microparticles is about 0.01 μm to about 1 μm.

2. The anode active material of claim 1,
 wherein the second coating layer is coated on the first coating layer.

3. The anode active material of claim 1, wherein the silicon microparticles of the first coating layer are present on the surface of the graphite core.

4. The anode active material of claim 1, further comprising: silicon microparticles within the graphite core.

5. The anode active material of claim 1, wherein the first coating layer is about 0.1 μm to about 3 μm thick, on average.

6. The anode active material of claim 1, wherein the second coating layer excluding the portion occupied by carbon fibers is about 0.1 μm to about 3 μm thick, on average.

7. The anode active material of claim 1, wherein the average diameter of the carbon fibers is about 0.01 μm to about 1 μm.

8. The anode active material of claim 1, wherein the aspect ratio of the carbon fibers is about 10 to about 200.

9. The anode active material of claim 1, wherein the carbon fibers are fabricated by vapor grown method.

10. The anode active material of claim 1, wherein the concentration of the silicon microparticles is about 3 wt % to about 15 wt % based on the total weight of the anode active material.

11. The anode active material of claim 1, wherein the concentration of the carbon fibers is about 0.1 wt % to about 20 wt % based on the total weight of the anode active material.

12. The anode active material of claim 1, wherein the first coating layer and the second coating layer comprise low crystalline carbon with an interlayer spacing of 3.45 Å or higher, or amorphous carbon.

13. An anode, comprising the anode active material of claim 1.

14. A lithium battery, comprising the anode comprising the anode active material of claim 1.

15. The anode active material of claim 1, wherein the first carbon film and the second carbon film have face-to-face dimensions of at least 3.45 Å.

16. The anode active material of claim 1, wherein the carbon fiber is not within the first carbon film.

* * * * *